United States Patent Office 2,803,561
Patented Aug. 20, 1957

2,803,561

PROCESS FOR RENDERING CALCIUM-CONTAINING MASONRY WATER-REPELLENT

William S. Kather, Schenectady, N. Y., assignor to General Electric Company, a corporation of New York No Drawing. Application May 27, 1952,
Serial No. 290,313

3 Claims. (Cl. 117—121)

This invention is concerned with a process for rendering masonry water-repellent. More particularly, the invention relates to rendering water-repellent certain types of masonry (herein defined to include formed masonry and materials used to make such formed masonry), which originally are non-water-repellent and which comprise a calcium salt substantially free of a silicon atom (other than impurities) or silicate radicals, which process comprises treating such types of masonry with a composition comprising an aqueous solution of a water-soluble alkali-metal salt of a hydrocarbon-substituted silane triol, thereby effecting a substantial coating and penetration of the masonry with the aqueous solution, and thereafter permitting the treated masonry to dry whereby the masonry becomes water-repellent as a result of the drying of the solution on the surface and in the pores of the masonry to deposit a hydrocarbon-substituted polysiloxane on the surface and in the pores of the masonry without closing its pores.

Silicone resins have been suggested as compositions suitable for rendering water-repellent masonry which is originally non-water-repellent. However, the use of such silicone resins has been accompanied by several disadvantages. In the first place, it has been necessary to use the silicone resins in the form of solutions in organic solvents. Generally, such solvents are expensive, flammable, and fairly toxic, and when employed in small, confined areas offer a health hazard unless adequate ventilation is provided for. This is often difficult to do and for this reason extreme care must be exercised in using such solutions of organic resins and this has in some respects limited the use of silicone resins for rendering masonry water-repellent, especially in confined areas such as cellars of homes, etc. Another disadvantage which has occurred in the use of silicone resins is the fact that when applied to calcium-containing surfaces free of silicon atoms or silicate groupings, for example, on limestone or marble surfaces, gypsum surfaces, etc., it has been found that the water-repellency induced is inferior to that obtained by applying the resin to other surfaces as, for instance, concrete surfaces, etc.

I have now discovered that I can render water-repellent various masonry surfaces containing the calcium atom and free of silicon atoms or silicate groupings, for example, limestone which is essentially calcium carbonate, and gypsum which is essentially calcium sulfate, by treating the surfaces of such materials with a water-soluble alkali-metal salt of a hydrocarbon-substituted silane triol. The use of these particular salts of hydrocarbon-substituted silane triols (for brevity hereinafter referred to as "metallic salts," which constitute the entire solids content in this form in the solution) is accompanied by unexpected and unobvious advantages and results, namely, these metallic salts render the particular masonry treated more water-repellent than it is possible to obtain by the use of silicone resins. This advantage in water-repellency is accompanied by a difference in kind rather than mere degree. In addition, of particular importance in the use of these metallic salts is the fact that they can be employed as water solutions thus dispensing with the necessity for using expensive and hazardous organic solvents.

The metallic salts employed in the practice of the present invention may be prepared from monoorganosilane triols or their condensation products and are described, for example, by Meads and Kipping, Journal of the Chemical Society, 105, page 679. The metallic salts can be prepared, for example, by hydrolyzing derivatives of a monohydrocarbon-substituted silane containing three hydrolyzable radicals, for instance, halogen atoms, alkoxy radicals, etc., connected to silicon, recovering the hydrolysis products, and dissolving these products in an aqueous solution of an alkali-metal hydroxide in such proportion that there is preferably though not necessarily present at least one equivalent of base per silicon atom. Further directions for making the metallic salts may be found disclosed in Krieble and Elliott Patent 2,507,200, issued May 9, 1950. The resultant solution containing the soluble metallic salt is diluted to the desired concentration, partially or completely neutralized, if desired, with salts such as aluminum nitrate, aluminum acetate, etc., as is more particularly disclosed and claimed in Torkelson application, Serial No. 290,318, now Patent 2,729,572 filed concurrently herewith and assigned to the same assignee as the present invention, which will give stable solutions after neutralization, and is applied to the water non-repellent calcium-containing masonry materials mentioned above by brushing, dipping, spraying or other suitable means. The treated materials are thereafter permitted to dry, preferably under mildly acidic conditions which the atmosphere generally comprises due to the carbon dioxide which is part of the atmosphere, which with water in the air combines to form carbonic acid which is sufficiently acidic to effect conversion of the metallic salt to a highly effective water-repellent composition and coating. The treated products, besides being water-repellent, show in the case of porous materials, scarcely any reduction in porosity. A particular advantage of the present method for rendering the particular types of masonry mentioned above water-repellent is its simplicity and freedom from acidic by-products which generally are found using organohalogenosilanes for rendering objects water-repellent as, for example, in Patnode Patent 2,306,222. This when coupled with the fact that water is used as the solvent, renders these compositions suitable for general application without employing any special equipment for handling or disposing of either acid or solvent vapors, etc.

The hydrolyzable monohydrocarbon-substituted silanes described above may be considered as having the formula $$RSiX_3$$

where R is a monovalent hydrocarbon radical, for example, alkyl (e. g., methyl, ethyl, propyl, isopropyl, butyl, hexyl, decyl, etc.), aryl (e. g., phenyl, naphthyl, biphenyl, etc.), aralkyl (e. g., benzyl, phenylethyl, etc.), alkaryl (e. g., tolyl, xylyl, etc.), and substituted hydrocarbon radicals in which the substituent is non-reactive with the hydrolyzable medium or with the inorganic base used to make the metallic salt. Such substituents are, for instance, halogens, e. g., chlorine, bromine, fluorine, etc. In the above formula X may be a halogen, for instance, chlorine, bromine, fluorine, etc.; alkoxy, e. g., methoxy, ethoxy, propoxy, etc.; amino groups, e. g., the —$NH_2$ grouping. Preferably, X is a halogen, particularly chlorine.

The inorganic bases employed to make the metallic salts are preferably bases of the alkali metals. Among such bases may be mentioned, for example, potassium hydroxide, sodium hydroxide, cesium hydroxide, etc.

Generally, it is desirable when making the metallic salt solution in water to obtain it in a concentrated form, for example, of the order of about 20 to 50 percent total solids content and thereafter dilute it with water to the desired concentration applicable for spraying or coating the above types of masonry. I have found that low concentrations of the metallic salt in water are desirable and concentrations of the order of about 0.15 to 9 percent, by weight, of the metallic salt (i. e., $RSiO_2M$ where R is a monovalent hydrocarbon radical and M is an alkali metal) in water are advantageously used. Stated alternatively, the concentration of the metallic salt, on a weight basis, calculated as $RSiO_{1.5}$, where R is a monovalent hydrocarbon radical, is preferably of the order of about 0.1 to about 6 percent of the total weight of the aqueous solution. It will, of course, be apparent to those skilled in the art that smaller or larger concentrations may be employed, depending on the material treated, the degree of water repellency desired, the amount of metallic salt solution applied, and the type of metallic salt used, but that within the range described above, for many applications optimum penetration and effective water repellency is obtained. It may be desired to add small amounts of alcohols or ketones to the water solution in order to enhance the stability of such solutions and lower their freezing point. In this respect small amounts of alcohols, ketones or ethers are employed which are miscible with the water solution. Ethanol is particularly effective and renders water solutions of the metallic salts stable in concentrations ranging from about 1 to 40 percent metallic salt. If desired, small amounts, say up to 10 percent by weight, based on the weight of the metallic salt can be added to the water solution of the alkali-metal salt.

In order that those skilled in the art may better understand how the present invention may be practiced, the following examples are given by way of illustration and not by way of limitation. All parts are by weight.

EXAMPLE 1

1 mol of methyltrichlorosilane was hydrolyzed by adding it rapidly with stirring to a large excess of water. The amount of water present was substantially in excess over that required to effect complete hydrolysis of all the silicon-bonded chlorine in the methyltrichlorosilane.

The resultant solution was allowed to stand until substantially all the methyl polysiloxane had precipitated in the form of a fine powder. This powder was filtered from the remaining solution, washed to remove acid, filtered, and dried. The solid gel particles were dissolved by stirring with a 50 percent, by weight, aqueous sodium hydroxide solution. Generally one mol of the methylpolysiloxane is allowed to react with about 1 to 1.05 mols of sodium hydroxide to give the metallic salt. The resultant alkaline solution had a total solids content of about 46.7 percent of which about 14.3 percent was titrated as sodium oxide and contained about 30 percent methylpolysiloxane solids calculated as

(about 2.4 percent was impurities like $NaCl$ or $Na_2CO_3$). The composition had a specific gravity of about 1.35 at 25° C. and a pH of about 13. This sodium salt of methylsilane triol (which is also known as sodium methyl siliconate) is believed to have structure I in dilute aqueous solutions, and it can be dried to a white solid having structure II as its molecular formula:

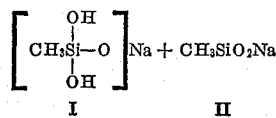

EXAMPLE 2

The sodium salt of methylsilane triol prepared in Example 1 was diluted with water to 2 percent and 5 percent methylpolysiloxane ($CH_3SiO_{1.5}$) solids content. Thereafter, slab samples (less than one inch thick) of concrete and Alabama limestone were treated as follows. Each sample was completely immersed in the water-repellent solution for 1 minute, air-dried for 2 hours, heated at about 40° C. for 18 hours, and thereafter immersed for 24 hours in approximately 3 inches of water. As controls, similar slabs which were not treated with the water-repellent metallic salt were given the same treatment. In addition a silicone resin which was available on the market for rendering masonry surfaces, particularly concrete, water-repellent was also applied to samples of Alabama limestone and concrete and given the same treatment and test described above. Each of the samples was then weighed to determine the percent water absorbed, the samples having been weighed before subjecting them to the tests described above. The following Table I shows the results of these tests:

Table I

| Water Repellent | Percent Water Absorption | |
|---|---|---|
| | Alabama Limestone | Concrete |
| Control (no water-repellent) | 5.4 | 7.0 |
| 2% Silicone Resin | 6.2 | 3.8 |
| 5% Silicone Resin | 5.9 | 1.7 |
| 2% $CH_3SiO_{1.5}$ in the form of the Sodium Salt of Methyl Silane Triol | 2.6 | 7.0 |
| 5% $CH_3SiO_{1.5}$ in the form of the Sodium Salt of Methyl Silane Triol | 1.1 | 6.7 |

From the results described in Example 2 it is apparent that the use of the sodium salt of methylsilane triol solution on limestone gave markedly improved results over those obtained with the other type of water repellent. It should be noted that the results on the limestone were superior to the other samples even though on concrete, which contains a silicon atom, the results were not as good as the results obtained using the silicone resin.

EXAMPLE 3

In this example, a 2 percent (calculated on a weight basis as $CH_3SiO_{1.5}$) aqueous solution of the sodium salt of methylsilane triol described in Example 1 was applied, by immersing for 30 seconds, slab specimens (less than one inch thick) of Indiana limestone, gypsum, and calcium silicate (cement-covered) in the water repellent, and air dried for 48 hours, after which the samples were partially immersed in ½ inch of water so that part of the sample was above the surface of the water. As controls, untreated slab samples of the limestone, gypsum and calcium silicate were immersed in water similarly as was done with the other samples. In addition, a silicone resin, available on the market for waterproofing purposes, in the form of a 2 percent resin solids solution in an organic solvent, was also used to treat the various specimens and this was given the same pretreatment and immersion test as the other samples. Each treating solution contained the same percentage concentration of water-repellent inducing material calculated as $CH_3SiO_{1.5}$. Table II below shows the percent water absorbed in each case after immersion in the water, the percent water absorption being tested after ½ hour, 1 hour, 8 hours and 24 hours immersion.

Table II

| | Percent Water Absorption | | | |
|---|---|---|---|---|
| | ½ hr. | 1 hr. | 8 hrs. | 24 hrs. |
| Indiana Limestone: | | | | |
|   Control (no water repellent) | 7.0 | 7.2 | | Saturated |
|   2% Silicone resin | 5.5 | 7.2 | | do |
|   2% Sodium salt of methylsilanetriol | 1.0 | 1.2 | 2.0% after 72 hrs. | |
| Gypsum: | | | | |
|   Control (no water repellent) | 36.0 | Saturated | | |
|   2% Silicone resin | 33.0 | | | |
|   2% Sodium salt of methylsilane triol | 0.0 | 0.0 | 0.7 | 2.6 |
| Calcium Silicate: | | | | |
|   Control (no water repellent) | 4.6 | 5.7 | | |
|   2% Silicone resin | 0.7 | 1.0 | | |
|   2% Sodium salt of methylsilane triol | 2.8 | 4.0 | | |

It will be apparent from an examination of Table II above that the use of the metallic salts herein described for rendering water-repellent calcium-containing materials substantially free of silicon atoms or silicate groupings gives water-repellent properties markedly superior to other silicone-containing compositions which are normally and presently employed for the purpose. The same marked improvement is obtained when the sodium salt is used in connection with gypsum, which, again, is a type of masonry containing a calcium atom and which is free of either a silicon atom or silicates. The results obtained in connection with calcium silicate show that the alkali-metal salt, specifically in this case the sodium salt, was not as effective as the silicone resins for the purpose. However, it should be noted that the use of the sodium salt did improve the water-repellency properties of the calcium silicate (which had been covered with cement) over that of the control.

EXAMPLE 4

In many instances, it is possible to induce water repellency in compositions such as gypsum by treating it with the alkali-metal salts herein described prior to forming the gypsum into integrated surfaces. At the time the gypsum powder is mixed with water prior to forming surfaces or objects therefrom I have found it advantageous to incorporate in the water used for that purpose, small amounts of the alkali-metal salts. In one instance, the sodium salt of methyl-silane triol described above in Example 1, in the form of an aqueous solution, was added to water used for mixing with the gypsum. The amount of the alkali salt (as $CH_3SiO_{1.5}$) present was approximately 0.5% based on the weight of the dry gypsum powder. The mixture was cast into molds, kept damp for twenty-four hours, and allowed to air-dry for two weeks. Following this aging procedure, the immersion test described in Example 2 was conducted with the following results: after one hour immersion in water the percent water absorbed was about 0.6% and after twenty-four hours the percent water absorbed was about 2.2%. The control sample without water-repellent absorbed about 36% water in ½ hour and was completely saturated.

EXAMPLE 5

This example illustrates the use of a dried alkali-metal salt of methylsilane triol in combination with gypsum powder which is later formed into a composite structure. More particularly, the sodium salt of methylsilane triol described above was dried by evaporating the water until a solid product was obtained. The latter was pulverized and added in varying amounts to the gypsum powder and the combination of ingredients mixed thoroughly until intimate dispersion of the alkali-metal salt in the gypsum was attained. Thereafter, sufficient water was added to the mixture to give a thick pasty consistency and this pasty mass was cast in the form of discs about 2 inches in diameter and ⅝ inch thick. These discs were permitted to dry for 24 hours at a temperature of about 100° F. and then aged at room temperature for about 3 days. Thereafter, each disc was immersed in about ½ inch water and weight before the immersion and after one hour immersion. The percent water absorbed in each case is disclosed in Table III below.

Table III

| Weight Percent $CH_3SiO_{1.5}$ in the Form of Sodium Methyl Siliconate [1] | Percent Water Absorbed After 1 Hour |
|---|---|
| None | 20.6 |
| 0.2 | 2.5 |
| 0.8 | 1.3 |
| 1.0 | 1.3 |

[1] Based on dry gypsum.

It will, of course, be apparent to those skilled in the art that instead of using sodium salts of the methylsilane triols, other salts, for example, potassium, lithium, cesium, etc., salts of the methylsilane triol may be used without departing from the scope of the invention. In addition, it will also be apparent that the invention is not limited to the particular organosilane triol described in the foregoing examples but other hydrocarbon-substituted silane triol salts may be employed as, for example, the metallic salts of phenylsilane triol (which may be prepared by hydrolyzing phenyltrichlorosilane and dissolving the hydrolysis product in a strong inorganic base), ethylsilane triol, benzylsilane triol, tolylsilane triol, etc., salts. It is to be understood that the particular concentrations of the metallic salts in water described above are not intended to be limiting and lower or higher concentrations of such metallic salts may be employed without departing from the scope of the invention. Generally, as the concentration of the metallic salt increases, the degree of penetration into the masonry decreases.

If desired, the treating solution in addition to the metallic salt of the monohydrocarbon-substituted silane triol, may also contain metallic salts of diorganosilane diols or their corresponding organopolysiloxane condensation products in a strong base, for instance, dimethylsilane diol or condensation products of the salt. Such materials may be prepared by dissolving in the strongly basic solution a silicone containing the recurring structural unit

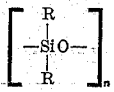

where R may be the same or different monovalent hydrocarbons, many examples of which have been given above, and $n$, is a whole number equal to at least 1.

While the invention has been described with specific reference to the treatment of limestone and gypsum, it will be apparent that similar masonry surfaces containing the calcium atom but free of the silicon atom or the silicate grouping may be treated without departing from the scope of the invention. From the standpoint of solubility and ease of manipulation, the lower alkylsilane triol salts, particularly the sodium or potassium salts of methylsilane triol, are preferred.

In addition to the calcium-containing materials described above, rendered water-repellent by means of my invention, other calcium-containing compositions free of silicon atoms may also be treated. Among these may be mentioned finely divided $CaCO_3$, $CaCl_2$, etc. Of particular importance is the treatment of cigarette paper for rendering it water-repellent. Such paper comprises about 25 percent, by weight, $CaCO_3$. The usual silicone water-repellents which might be applicable for such purposes are cyclic hydrolysis products of $CH_3SiHCl_2$, or chain-stopped methyl hydrogen polysiloxanes alone, or combinations of the latter two hydrolysis products with other organopolysiloxanes, e. g., methylpolysiloxane oils or resins. However, such materials are expensive and the $CH_3SiHCl_2$ used to make them is not readily available. In addition, excessive heats and times are required to cure the organopolysiloxane on the paper. Moreover, the above polysiloxanes must be used either in solution in organic solvents which are toxic and flammable, or in the form of emulsions which are relatively unstable and must be used shortly after being made up.

I have found that the aforementioned cigarette paper is advantageously rendered water-repellent with the metallic salts herein described while at the same time obviating the disadvantages recited above attending the use of usual organopolysiloxanes. The following table shows the angles at which drops of water will roll off cigarette paper containing various amounts of the sodium salt of methylsilane triol, this test being a standard test for water-repellency of cigarette paper. The cigarette paper was prepared by dipping samples of the latter in solutions of the sodium salt using various concentrations of the latter, squeezing out excess liquid at about 50 p. s. i., and permitting the paper to air-dry for about ½ hour.

Table IV

| Percent Sodium Salt of Methylsilane Triol in Solution | Angle in Degrees |
| --- | --- |
| None | Wet surface. |
| 0.1 | 61. |
| 0.2 | 55. |
| 0.3 | 46. |
| 0.4 | 45. |
| 0.5 | 43. |
| 0.6 | 49. |
| 0.7 | 51. |
| 0.8 | 50. |
| 0.9 | 50. |
| 1.0 | 51. |

The air-drying can be accelerated, if desired, by the use of heated rollers over which the treated paper is passed briefly.

Treatment of the aforesaid cigarette paper with various concentrations of hydrolyzed $CH_3SiHCl_2$ in toluene (said hydrolyzed product generally being accepted as an effective material for rendering textiles and paper water-repellent) gave the following results using the same treating and testing procedure stated above except that the treated paper samples were heated for 5 minutes at 150° C. to effect curing of the deposited water-repellent, the said heat treatment being necessary to obtain a useful product.

Table V

| Percent Methyl Hydrogen Polysiloxane in Treating Solution | Angle in Degrees |
| --- | --- |
| 0.05 | 60 |
| 0.1 | 59 |
| 0.2 | 57 |
| 0.3 | 55 |

According to cigarette paper manufacturers, water-repellent paper should shed water drops at a maximum angle of about 51 degrees.

In general, good results appear to be obtained when the treating solutions are of a solids content (calculated as $RSiO_{1.5}$ where R is a monovalent hydrocarbon radical) of the order of from about 0.1 to 10 percent of the total weight of the treating aqueous solution. However, the invention is not limited to these proportions since acceptable water-repellency depends on the amount of alkali-metal salt picked up and retained by the material being treated. Each application will dictate the optimum concentration of alkali-metal salt to be used.

What I claim as new and desire to secure by Letters Patent of the United States is:

1. The process for rendering water repellent a masonry selected from the class consisting of limestone and gypsum masonries which process comprises (1) treating said masonry with a composition comprising an aqueous solution of a water-soluble alkali-metal salt of an alkyl silanetriol, to effect coating and penetration of the masonry with the solution, the concentration of the alkali-metal salt being equal, by weight, to from 0.1 to 6% of the total weight of the aqueous solution when calculating the metallic salt as $RSiO_{1.5}$, where R is an alkyl radical, and (2) causing the treated masonry to become water-repellent by drying it to convert the aforesaid alkali-metal salt to an alkyl poly-siloxane which coats the surface of the masonry and penetrates the pores of the masonry without closing the pores.

2. The process for rendering limestone masonry water-repellent which comprises (1) treating said limestone masonry with a composition comprising an aqueous solution of a water-soluble sodium salt of methylsilanetriol to effect coating and penetration of the masonry with the solution, the concentration of the sodium salt calculated as $CH_3SiO_{1.5}$ being equal, by weight, to from 0.1 to 6% of the total weight of the aqueous solution, and (2) causing the treated masonry to become water-repellent by drying it to convert the aforesaid sodium salt to a methylpolysiloxane which coats the surface of the masonry and penetrates the masonry without closing its pores.

3. The process for rendering gypsum water-repellent which comprises (1) treating said gypsum with a composition comprising an aqueous solution of a water-soluble sodium salt of methylsilanetriol to effect coating and penetration of the gypsum with the solution, the concentration of the sodium salt calculated as $CH_3SiO_{1.5}$ being equal, by weight, to from 0.1 to 6% of the total weight of the aqueous solution, and (2) causing the treated gypsum to become water-repellent by drying it to convert the aforesaid sodium salt to a methylpolysiloxane which coats the surface of the masonry and penetrates the pores of the gypsum without closing its pores.

References Cited in the file of this patent

UNITED STATES PATENTS

| | | |
| --- | --- | --- |
| 1,287,453 | Sanderson | Dec. 10, 1918 |
| 1,975,787 | Hansen | Oct. 9, 1934 |
| 2,288,633 | Luckhaupt | July 7, 1942 |
| 2,334,499 | Millard | Nov. 16, 1943 |
| 2,356,542 | Sloan | Aug. 22, 1944 |
| 2,438,055 | Hyde et al. | Mar. 16, 1948 |
| 2,491,487 | Faulwetter | Dec. 20, 1949 |
| 2,507,200 | Elliott et al. | May 9, 1950 |
| 2,574,168 | Brick | Nov. 6, 1951 |
| 2,582,215 | Hyde | Jan. 15, 1952 |
| 2,679,495 | Bunnell | May 25, 1954 |

FOREIGN PATENTS

| | | |
| --- | --- | --- |
| 303,935 | Great Britain | Jan. 17, 1929 |